Feb. 3, 1959 J. J. PISANI 2,871,548

METHOD OF ASSEMBLING ELECTRONIC COMPONENTS

Filed April 15, 1955

INVENTOR.
JOHN J. PISANI
BY W. E. Thibodeau,
A. W. Dew & H. I. Forman
ATTORNEYS:

2,871,548

METHOD OF ASSEMBLING ELECTRONIC COMPONENTS

John J. Pisani, Haddonfield, N. J.

Application April 15, 1955, Serial No. 501,755

7 Claims. (Cl. 29—155.5)

Figure 1:
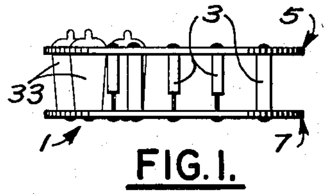

(Granted under Title 35, U. S. Code (1952), sec. 266)

The invention described herein may be manufactured and used by or for the Government for governmental purposes without the payment of any royalty thereon.

The present invention relates to techniques in manufacture and more particularly to a method of assembling a plurality of electrical components into a composite unit.

Modern trends in manufacturing have been directed, to a great extent, toward methods and designs which lend themselves to space saving techniques, either by way of miniaturization or a composite unit, automatic production, or units to facilitate servicing. The electronics industry is one which has progressed largely and favorably along these lines. The present invention, although particularly directed to a composite unit useful in the electronics industry, may also be found to be applicable to other industrial methods of related kind.

The composite unit cf the present invention is one the design of which is commonly referred to in the industry as a "sandwich" type unit. This type of unit is one wherein a plurality of components are supported in spaced apart, parallel relation between two plates. By employing printed circuit connections or other suitable connecting means on the plates, the components may be electrically connected to provide a complete circuit or a portion of a circuit, as the case may be. Such a unit is found to be particularly useful in radio apparatus where it is important that loss of operating time be kept to a minimum. By employing units of this kind, breakdowns occasioned by failure of one or more components can be corrected simply and quickly by removing the unit in which the defective component is located and substituting a new unit in its place in much the same way that a radio tube is replaced when found to be defective.

Although units of this kind possess many advantages, difficulty is encountered in the method of assembly. For example, mounting of the components on the one end plate is easily accomplished but to thread the leads of the components through the apertures in the other end plate presents somewhat of a problem due to the multiplicity of leads having to be oriented with the apertures.

Therefore, a primary object of the present invention is to provide a simple and easy method whereby the assembly of units of the kind referred to above is facilitated.

Another object of the present invention is to provide a method of assembly which is particularly adaptable to units of the "sandwich" type.

Still another object of the present invention is to provide a method of assembly which will overcome the above as well as other disadvantages characteristic of prior art assembly methods.

A further object of the present invention is to provide a method of assembling electrical components into a composite unit which can be quickly and easily accomplished with a minimum of equipment.

In accordance with the present invention, the method proposed comprises the following steps: providing first and second end plates having a plurality of openings therein; supporting the first end plate substantially in a horizontal position; providing support means for holding the components in spaced apart; parallel relation above the first end plate; inserting the leads of the components to be associated with the first end plate through the openings in that plate while supporting the components with the aid of the support means; attaching the leads extending through the first end plate to that end plate; removing the support means; disposing the second end plate with the leads of the components to be associated therewith through the openings in that plate; and attaching the leads extending through the openings in the second end plate to that plate. Thus, a composite unit is provided with the components supported in spaced apart, parallel relation between two end plates. The invention contemplates the use of printed circuit connections on at least one face of each end plate for connecting the component leads in accordance with an electrical circuit. In addition, the invention further provides for the use of a jig or work holder to facilitate orientation and other assembly operations.

Figure 2:
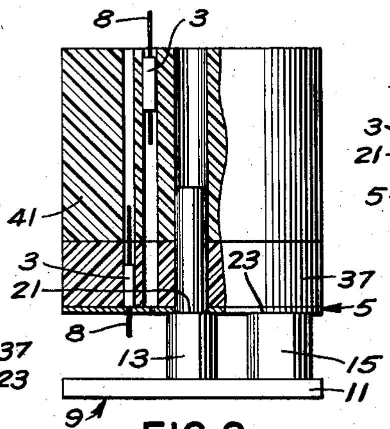
Figure 3:
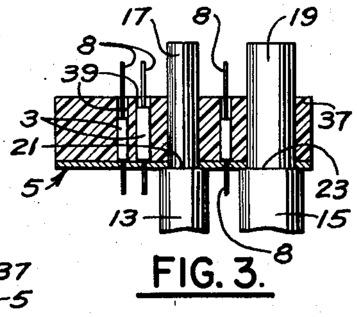
Figure 4:
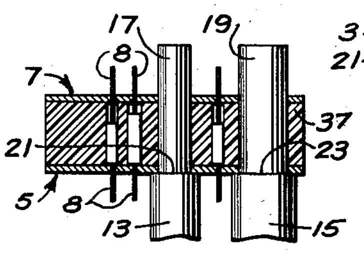
Figure 7:
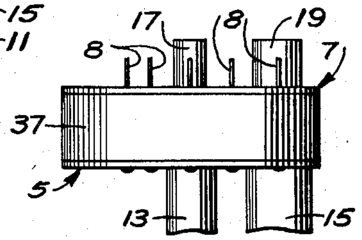
Figure 5:
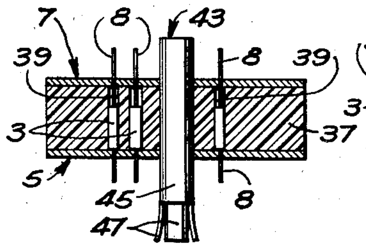
Figure 6:
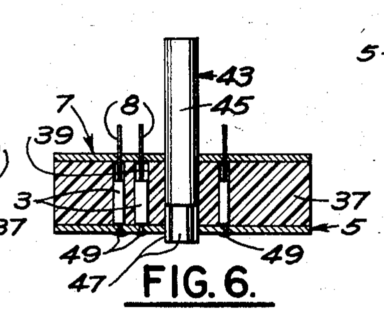
Figure 8:
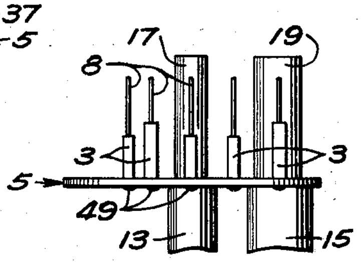
Figure 9:
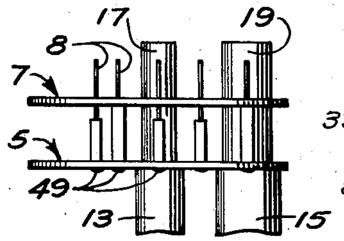
Figure 10:
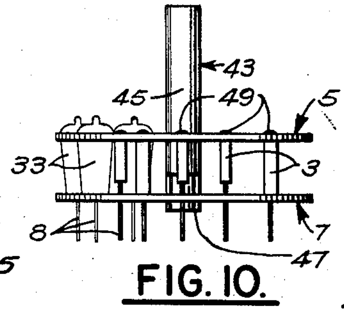
Figure 11:
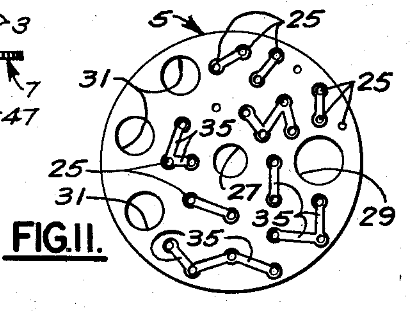
Figure 12:
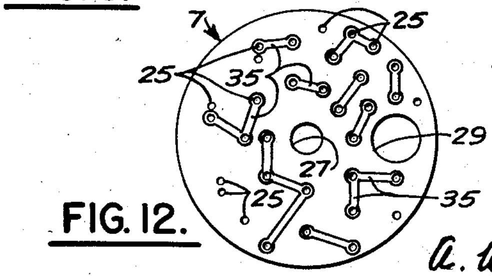

The novel features characteristic of the present invention, as well as additional objects and advantages thereof, will be understood better from the following detailed description when read in connection with the accompanying drawing in which, Figure 1 is a side elevation of a completed electronic unit assembled in accordance with the method of the present invention, Figure 2 is a side view of apparatus useful in practicing the method of the present invention, with portions thereof cut away to show details of internal structure, the view also illustrating a step in the method of inserting the components, Figure 3 is a side view, partly in section and partly in elevation, of the components inserted and supported in position relative to the first end plate, Figure 4 is a view, similar to Figure 3, showing a step subsequent to that shown in Figure 3, with the second end plate applied to facilitate holding the parts in position, Figure 5 is a view similar, to Figure 4, showing a substituted jig applied to the assembly to facilitate the dip soldering operation, Figure 6 is a view, similar to Figure 5, showing the assembly subsequent to attaching the component leads to the first end plate, Figure 7 is an elevation view of the assembly shown in Figure 6 subsequent to replacing the assembly on the original supporting jig, Figure 8 is a view of the parts shown in Figure 7 subsequent to removal of the second end plate and the catacomb, Figure 9 is a view, similar to Figure 8, after the second end plate has been replaced on the component leads to be associated therewith, Figure 10 is a view, similar to Figure 9, showing the assembly prepared for attaching the component leads to the second end plate, Figure 11 is a plan view of the first end plate with printed circuit connections thereon, and Figure 12 is a plan view of the second end plate with printed circuit connections thereon.

Referring more particularly to the drawing, wherein similar reference characters have been used to designate corresponding parts throughout, various stages are shown in assembling an electrical unit practicing the method steps of the present invention.

Figure 1 of the drawings is representative of a completed electrical unit 1 of the "sandwich" type which comprises a plurality of components 3 supported in spaced apart, parallel relation between two end plates 5, 7. The components 3 may comprise, for example, condensers, resistors, vacuum tubes, or other electrical parts which have leads extending from at least one end thereof for connection electrically in accordance with a selected circuit.

In order to facilitate assembly operations, a suitable jig or other support 9 is provided. The jig herein shown comprises a base 11 on which two spindles 13, 15 are supported and disposed to extend vertically and in spaced apart, parallel relation. The upper ends 17, 19 of these spindles are of reduced diameter thereby to provide a shoulder 21, 23 on each spindle. The shoulders are located substantially in a horizontal plane for a purpose which will become evident from the description hereinafter presented.

The end plates 5, 7 may be made from any suitable material and may be of any size or shape. However, for an electrical unit, the end plates should be made from a suitable insulating material. The end plates are each provided with a plurality of apertures 25 or holes for receiving the component leads 8. A central aperture 27 is provided for supporting the plates in a substantially horizontal position during assembly of the unit. Another aperture 29 is provided offset from the central aperture to facilitate orienting the two end plates. Additional apertures 31 may be provided, such as those shown in Figure 11 of the drawing, for receiving vacuum tubes 33 or other components, in like manner to that shown in Figure 1 of the drawing.

The end plates 5, 7 may also be provided with suitable connections 35 on at least one face thereof. These connections may be applied by any suitable means, for example, any of the well known printed circuit techniques. If the unit is intended for connection circuitwise, the connections are disposed between selected apertures 25 in accordance with the components to be connected to conform to a selected circuit. For purposes of description, the end plates are referred to hereinafter as the first end plate 5 and the second end plate 7.

Assembly of the composite unit 1 is accomplished in the following manner: The first end plate 5 is supported in a substantially horizontal position with a side thereof having printed circuit connections 35 thereon facing downwardly. The support 9 may be utilized to facilitate assembly of the unit, in which case, the first end plate is mounted on the support with the central spindle 13 disposed with its reduced end 17 extended through the central opening 27 of the first end plate and with the other spindle 19 extending through the orienting aperture 29 of the first end plate. Thus the first end plate is supported in a substantially horizontal position on the shoulders 21, 23 of the spindles 13, 15.

A catacomb 37 is provided to facilitate support of the components 3 as well as to assist in inserting the component leads 8 through the openings 25 in the first end plate. The catacomb may be made from any suitable material and is provided with a plurality of apertures 39 correspondingly located with respect to the apertures 25 in the first end plate 5. The catacomb apertures 39 are, however, of a size slightly larger than the diameter of the components they are to receive so that the components will be free to move in the catacomb openings and permit the component leads to be threaded through the openings in the first end plate and, at the same time, lend support to the components until their leads are attached to the first end plate. For further assistance in inserting the components, particularly in automatic feeding thereof, a pilot catacomb 41 may be provided. The pilot catacomb is similar to the first mentioned catacomb and is provided with a like number of apertures through which the components are to be fed one at a time for each assembly.

If a catacomb is employed during assembly of the unit it is disposed on the support above the first end plate 5, in a manner similar to and oriented with respect to that end plate, as shown in Figures 2 and 3 of the drawing.

The components 3 are inserted in the catacomb openings 39 with the leads 8 thereof to be associated with the first end plate extending downwardly through the openings 25 in that plate, in the manner shown in Figure 3. The arrangement of the assembly will leave the upwardly extending component leads protruding above the catacomb sufficiently to receive the second end plate 7. Although the catacomb may be sufficient to support the components so that, after they are attached in place, their upwardly extending leads will thread easily through the openings in the second end plate 7, it will be found to be preferable to place the second end plate above the catacomb with the leads extending through the openings in that plate. By so doing, orientation of the leads for subsequent assembly operations will be insured. Therefore, it is recommended that the second end plate be disposed in place above the catacomb, in the manner shown in Figure 4 of the drawing.

The next step is to attach the downwardly extending leads 8 to the first end plate 5 or to the printed circuit connections on that plate. For this operation, the support 9 employed may not be found suitable, particularly where the attaching means employed is a dip soldering method. Therefore, a more suitable jig or holder may be substituted which will maintain the parts in assembled relation during the attaching operation. A suggested work holder is the holder 43 shown in Figures 5, 6 and 10 of the drawing. This work holder comprises a shaft 45 having a diameter substantially equal to that of the central openings 27 in the end plates and the catacomb and a plurality of outwardly extending resilient fingers 47 on one end thereof. This holder is attached by inserting the shaft end 45 through the central openings from the side of the assembly on which the first end plate 5 is located and then drawing it through the assembly until the spring fingers 47 engage the members of the assembly sufficiently to hold them securely during the attaching operation. Figures 5 and 6 illustrate the relationship of the assembly parts together with this work holder.

The assembly is then ready for attaching those leads of the components to be associated with the first end plate 5 to that plate or to the printed circuit connections 25 on that plate. This is done at this stage in the assembly in order to fix or secure the components 3 in position for subsequent operations requiring their relative positions to be maintained without the support of the catacomb. In the case of an electrical assembly, it has been found expedient to employ a dip soldering technique and then removing the excess leads beyond the soldered connections. The assembly will then appear as shown in Figure 6, with soldered connections 49 on the outwardly disposed face of the first end plate 5.

The assembly is then replaced on the first mentioned support 9, in the manner shown in Figure 7 of the drawing. The second end plate 7 and the catacomb 9 are then removed leaving the components supported in fixed positions on the first end plate 5 with their free leads extending upwardly, in the manner shown particularly in Figure 8 of the drawing.

The second end plate 7 is then replaced on the support 9 with the upwardly extending component leads inserted through the openings 25 in that plate. Since the components themselves are held or supported in a fixed position the threading of the leads is accomplished easily and no difficulty should be encountered in disposing the second end plate in place.

Once the second end plate is disposed in place on the component leads to be associated therewith, as shown in Figure 9 of the drawing, the assembly is removed from the support 9 and made ready for attachment of the leads to the second end plate. Again the work holder 43 may be employed in the same manner as before with the exception that the assembly is inverted so as to dispose the second end plate with leads extending therethrough downwardly, as shown in Figure 10, for the dip soldering operation. After the leads are attached to the second end plate, the excess portions of the leads are removed and the work holder withdrawn. The unit is then complete and will be as shown in Figure 1.

The composite unit 1 contemplates accommodating vacuum tubes 8 having leads extending from at least one end thereof. Although the present invention has been described without stating specifically the steps to be followed in applying such tubes to the assembly, it is presumed that this procedure will be evident from the description herein to one skilled in the art and will be governed according to the particular circumstances. Furthermore, in order to facilitate inserting the components and threading of their leads through the end plate openings, it is suggested that the entire assembly be subjected to vibration either manually or mechanically.

From the foregoing description, it will be recognized that the present invention provides a simple method of assembling a plurality of components into a unit of the "sandwich" type. In addition, it will be recognized that the method of the present invention will lend itself readily to automatic, large quantity production techniques, as well as small quantity, pilot-line production. It will also be evident to those persons skilled in the art that the method steps of the present invention may be applied to end items other than electronic assemblies and that changes and modification in the method steps themselves or in their sequence are possible within the spirit of the present invention. Therefore, it is desired that the particular form of the present invention shown and described herein shall be considered as illustrative and not as limiting.

I claim:

1. The method of assembling into a unit a plurality of electrical components which have leads extending from their opposite ends, which method comprises the steps of providing first and second end plates having a plurality of openings of a size smaller than said components and larger than said leads therein, supporting said first end plate substantially in a horizontal position, providing means for supporting the components above said first end plate in spaced apart, parallel relation, mechanically positioning and inserting those leads of the components to be associated with said first end plate through the openings in that plate while supporting the components with said support means above that plate, attaching the leads extending through said first end plate openings to that end plate, removing said support means, bringing said second plate into a position where its openings are each aligned with a corresponding unattached component lead, moving said second plate into engagement with the free ends of the longer of said components, and attaching said last mentioned leads to said second end plate thereby to provide a unit with the components supported in spaced apart, parallel relation between two end plates.

2. The method of assembling into a unit a plurality of electrical components which have leads extending from their opposite end, which method comprises the steps of providing first and second end plates having a plurality of openings of a size smaller than said components and larger than said leads therein, supporting said first end plate substantially in a horizontal position, providing means for supporting the components above said first end plate in spaced apart, parallel relation, mechanically positioning and inserting those leads of the components to be associated with said first end plate through the openings in that plate while supporting the components with said support means above that plate, supporting said second end plate above said support means with the leads of those components to be associated with said second end plate disposed through the openings in that plate, attaching the leads extending through said first end plate openings to that end plate, removing said second end plate and said support means, bringing said second plate into a position where its openings are each aligned with a corresponding unattached component lead, moving said second plate into engagement with the free ends of the longer of said components, and attaching said last mentioned leads to said second end plate thereby to provide a unit with the components supported in spaced apart, parallel relation between two end plates.

3. The method of assembling into a unit a plurality of electrical components which have leads extending from their opposite ends, which method comprises the steps of, providing first and second end plates having a plurality of openings of a size smaller than said components and larger than said leads therein, supporting said first end plate, providing means for supporting the components in spaced apart, parallel relation, disposing said support means above said first end plate, disposing the components in said support means, mechanically positioning and inserting those of the component leads to be associated with said first end plate through the openings in that plate, supporting said second end plate above said support means, inserting those of the component leads to be associated with said second end plate through the openings in that plate, securing the leads extending through said first end plate openings to that end plate, removing said second end plate and said support means, bringing said second plate into a position where its openings are each aligned with a corresponding unattached component lead, moving said second plate into engagement with the free ends of the longer of said components, and securing said last mentioned leads to said second end plate thereby to provide a unit with the components supported in spaced apart, parallel relation between two end plates.

4. The method of assembling into a unit a plurality of electrical components which have leads extending from their opposite ends, which method comprises the steps of providing first and second end plates having a plurality of openings of a size smaller than said components and larger than said leads therein, supporting said first end plate, providing a catacomb having a plurality of openings of larger diameter than said components and being disposed parallel to each other and extending therethrough correspondingly located with respect to said end plate openings, supporting said catacomb above said first end plate with the openings thereof in alignment, inserting the components into said catacomb openings, mechanically positioning and inserting the leads of those components to be associated with said first end plate through the openings in that plate, supporting said second end plate above said catacomb with the leads of those components to be associated with said second end plate disposed through the openings in that plate, securing the leads extending through said first end plate openings to that end plate, removing said second end plate and said catacomb, bringing said second plate into a position where its openings are each aligned with a corresponding unattached component lead, moving said second plate into engagement with the free ends of the longer of said components, and securing said last mentioned leads to said second end plate thereby to provide a unit with the components supported in spaced apart, parallel relation between two end plates.

5. The method of assembling into a unit a plurality of electrical components which have leads extending from their opposite ends, which method comprises the steps of, providing first and second end plates having a plurality of openings of a size smaller than said components and larger than said leads therein, providing a jig, supporting said first end plate on said jig substantially in a horizontal position, providing a catacomb for supporting the components in openings of larger diameter than said components and disposed therein in positions correspondingly located with respect to the openings in said first end plate, supporting said catacomb on said jig above said first end plate with the openings thereof in alignment, inserting the components into said catacomb openings, mechanically positioning and inserting the leads of those components to be associated with said first end plate through the openings in that plate, supporting said second end plate on said jig above said catacomb with the leads of those components to be associated with said second end plate extending through the openings in that plate, securing the leads extending through said first end plate openings to that end plate, removing said second end plate and said catacomb from said jig, replacing said second end plate on said jig with the leads to be associated with said second end plate extending through the openings in that plate, securing said last mentioned leads to said second end plate, and removing said jig, thereby to provide a unit with the components supported in spaced apart, parallel relation between two end plates.

6. The method of assembling into a printed circuit unit a plurality of electrical components which have leads extending from their opposite ends, which method comprises the steps of, providing first and second end plates having a plurality of openings of a size smaller than said components and larger than said leads therein, providing printed circuit connections on at least one side of each of said end plates between selected openings and to which the component leads are to be attached, supporting said first end plate with a side having printed circuit connections thereon facing downwardly, providing a catacomb having a plurality of openings of larger diameter than said components and disposed parallel to each other in positions correspondingly located with respect to the openings in said first end plate, supporting said catacomb above said first end plate with the openings thereof in alignment, mechanically positioning and inserting the components into said catacomb openings, influencing the leads of those components to be associated with said first end plate through the openings in that plate, supporting said second end plate above said catacomb with a side thereof having printed circuit connections thereon facing upwardly and with the leads of those components to be associated with said second end plate disposed through the openings in that plate, securing the leads extending through said first end plate openings to the printed circuit connections thereon, removing said second end plate and said catacomb, bringing said second plate into a position where its openings are each aligned with a corresponding unattached component lead, moving said second plate into engagement with the free ends of the longer of said components, and securing said last mentioned leads to the printed circuit connections on said second end plate, thereby to provide a printed circuit unit with the components disposed in spaced apart, parallel relation between two end plates and with their leads connected circuitwise.

7. The method of assembling into a printed circuit unit a plurality of electrical components which have leads extending from their opposite ends, which method comprises the steps of, providing first and second end plates having a plurality of openings of a size smaller than said components and larger than said leads therein, providing printed circuit connections on at least one side of each said end plate between selected openings and to which the component leads are to be attached, providing a jig, supporting said first end plate on said jig with the side thereof having printed circuit connections thereon facing downwardly, providing a catacomb for supporting the components in openings of larger diameter than said components and disposed therein in positions correspondingly located with respect to the openings in said first end plate, supporting said catacomb on said jig above said first end plate with the openings thereof in alignment, inserting the components into said catacomb openings, influencing the leads of those components to be associated with said first end plate openings through the openings in that plate, supporting said second end plate on said jig above said catacomb with a side thereof having printed circuit connections thereon facing upwardly and with the leads of those components to be associated with said second end plate disposed through the openings in that plate, securing the leads extending through said first end plate openings to the printed circuit connections thereon, removing said second end plate and said catacomb from said jig, replacing said second end plate on said jig with the side having printed circuit connections thereon facing upwardly and with the leads to be associated with said second end plate extending through the openings in that plate, securing said last mentioned leads to the printed circuit connections on said second end plate, and removing said jig, thereby to provide a printed circuit unit with the components disposed in spaced apart, parallel relation between two end plates and with their leads connected circuitwise.

References Cited in the file of this patent

UNITED STATES PATENTS 2,660,957 Koskinen ---------------- Dec. 1, 1953